US006965840B2

(12) United States Patent
Summers et al.

(10) Patent No.: US 6,965,840 B2
(45) Date of Patent: *Nov. 15, 2005

(54) DUAL SENSOR PROCESS TEMPERATURE SWITCH HAVING A HIGH-DIAGNOSTIC ONE-OUT-OF-TWO VOTING ARCHITECTURE

(75) Inventors: Angela E. Summers, Houston, TX (US); Bryan A. Zachary, Alvin, TX (US)

(73) Assignee: SIS-Tech Applications, L.P., Houston, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/664,502

(22) Filed: Sep. 17, 2003

(65) Prior Publication Data

US 2004/0128099 A1      Jul. 1, 2004

Related U.S. Application Data

(63) Continuation-in-part of application No. 09/901,213, filed on Jul. 9, 2001, now Pat. No. 6,704,682.

(51) Int. Cl.[7] .................... G01K 13/00; G05D 23/00
(52) U.S. Cl. .................... 702/130; 702/50; 700/299; 340/501
(58) Field of Search .................... 702/33, 35, 45, 702/50–53, 55, 85, 98–100, 109, 130–132, 702/133–136, 138, 140, 182–184; 700/299, 700/301; 73/307, 753, 170.12, 861.01; 340/501, 340/603, 607; 137/487.5, 557, 66, 79, 80; 374/170, 208

(56) References Cited

U.S. PATENT DOCUMENTS 4,870,863 A * 10/1989 Duncan et al. ................ 73/431

6,704,682 B2 * 3/2004 Summers et al. ........... 702/138

* cited by examiner

Primary Examiner—Marc S. Hoff
Assistant Examiner—Manuel L Barbee
(74) Attorney, Agent, or Firm—Raymond R. Ferrera; Arnold & Ferrera, LLP

(57) ABSTRACT

A high-diagnostic, dual sensor process temperature switch having a one-out-of-two voting architecture useful in commercial and industrial fluid transport systems is provided for determining whether process connections and isolation valves are plugged or closed, and for determining whether individual temperature sensors within the device are deformed, corroded or otherwise compromised. The dual temperature sensors functionally employ similar electronic technology, and are each disposed to provide variable electrical outputs to one of a plurality of discrete A/D converters. The dual temperature sensors' electrical outputs are compared prior to the A/D conversion process in order to immediately identify large temperature deviations between the respective sensors. Each of the A/D converters' digital signals are routed to one of a plurality of independent CPUs or data processors; the CPUs then generate digital output signals representing either a logical 0 (Low) or 1 (High). Each of the digital output signals are routed to one of a plurality of independent output circuits, each of which either opens or closes an associated output switch responsive to the CPUs' logically evaluated output signals. Each of the plurality of output switches is connected in series with the output switches of the other output circuit(s), and the output signals are voted across the series in a one-out-of-two architecture to determine whether the device's temperature switch output circuit will either open or remain closed. In addition to routing their respective output signals to the temperature switch output circuits, the CPUs also transmit the output signals to an integrated diagnostics circuit for detection of "failed safe" conditions, and to close any circuit around an output that is determined to be failed safe.

14 Claims, 3 Drawing Sheets

| Output Circuit | Diagnostics Switch Circuit #1 | CPU #1 Signal | Output Circuit #1 Signal | CPU #2 Signal | Output Circuit #2 Signal |
|---|---|---|---|---|---|
| Open | Open | 0 | 0 | 0 | 0 |
| Open | Open | 0 | 0 | 1 | 0 |
| Open | Open | 0 | 0 | 0 | 1 |
| Open | Open | 0 | 0 | 1 | 1 |
| Open | Open | 1 | 0 | 0 | 0 |
| Open | Open | 1 | 0 | 1 | 0 |
| Open | Open | 1 | 0 | 0 | 1 |
| Closed | Closed | 1 | 0 | 1 | 1 |
| Open | Open | 0 | 1 | 0 | 0 |
| Open | Open | 0 | 1 | 1 | 0 |
| Open | Open | 0 | 1 | 0 | 1 |
| Closed | Closed | 0 | 1 | 1 | 1 |
| Open | Open | 1 | 1 | 0 | 0 |
| Closed | Open | 1 | 1 | 1 | 0 |
| Closed | Open | 1 | 1 | 0 | 1 |
| Closed | Open | 1 | 1 | 1 | 1 |

| Temperature Switch Output Circuit | Diagnostics Switch Circuit #2 | CPU #2 Signal | Output Circuit #2 Signal | CPU #1 Signal | Output Circuit #1 Signal |
|---|---|---|---|---|---|
| Open | Open | 0 | 0 | 0 | 0 |
| Open | Open | 0 | 0 | 1 | 0 |
| Open | Open | 0 | 0 | 0 | 1 |
| Open | Open | 0 | 0 | 1 | 1 |
| Open | Open | 1 | 0 | 0 | 0 |
| Open | Open | 1 | 0 | 1 | 0 |
| Open | Open | 1 | 0 | 0 | 1 |
| Closed | Closed | 1 | 0 | 1 | 1 |
| Open | Open | 0 | 1 | 0 | 0 |
| Open | Open | 0 | 1 | 1 | 0 |
| Open | Open | 0 | 1 | 0 | 1 |
| Closed | Closed | 0 | 1 | 1 | 1 |
| Open | Open | 1 | 1 | 0 | 0 |
| Closed | Open | 1 | 1 | 1 | 0 |
| Closed | Open | 1 | 1 | 0 | 1 |
| Closed | Open | 1 | 1 | 1 | 1 |

DUAL SENSOR PROCESS TEMPERATURE SWITCH HAVING A HIGH-DIAGNOSTIC ONE-OUT-OF-TWO VOTING ARCHITECTURE

CROSS-REFERENCE TO RELATED APPLICATIONS

The instant application is a continuation-in-part of prior application Ser. No. 09/901,213 Jul. 9, 2001 U.S. Pat. No. 6,704,682, to which application priority is hereby claimed.

BACKGROUND OF THE INVENTION

1. Field of the Invention

The present invention relates generally to temperature switches useful for monitoring fluid process conditions in commercial and industrial fluid transport systems. In a specific, non-limiting embodiment, the invention relates to a high-diagnostic dual sensor fluid temperature switch having a one-out-of-two voting architecture.

2. Background of the Invention

In many commercial and industrial fluid transport systems, temperature switches are employed to measure the operational temperature of a process fluid disposed within the transport system. In particular, temperature switches are commonly used in sensitive fluid transport environments to detect hazardous process conditions, and to initiate the shut down of one or more process functions when a hazardous temperature condition is detected.

Generally, such temperature switches are disposed in an enclosed body that also houses an inert signal transfer medium, such as silicon, thereby effectively isolating the process fluid being measured from the temperature sensors. The housing therefore provides protection for the sensors from physical damage that could be directly caused by the heat of the process fluid. In this configuration, temperature is transmitted to the temperature sensor via the transfer medium, usually through diaphragms located on the housing body, which effectively separate the process fluid from the transfer medium while still permitting fluid temperatures to be transmitted to the sensors.

Such temperature switches typically require verification of their operational stability at regular intervals to ensure accurate calibration and system functionality, especially in sensitive fluid transport applications. The most common calibration problems affecting presently known temperature switches are "span-shift" and "zero-shift".

Span-shift occurs when the sensitivity of a temperature sensor is no longer accurate over an entire range of predetermined operational temperatures. In contrast, zero-shift occurs when all of the temperature sensor readings are off by some constant error value within the required range. In some temperature sensors, zero-shift is much more likely to occur than span-shift; in other applications, span shift is more prevalent. Unfortunately, presently known temperature switches cannot generally detect either span-shift or zero-shift while a fluid transport system remains on-line. Instead, the switch must be removed from process service to validate calibration, thereby requiring the transport system to be taken off-line, at least with respect to the particular process function being tested, and additional operation and maintenance personnel with appropriate testing equipment.

Thus, a need exists to provide a dual sensor temperature switch having a high-diagnostic, one-out-of-two voting architecture (also referred to as "1oo2D") capable of detecting both span-shift and zero-shift in the sensors without first removing the temperature switch from process service, and without requiring additional personnel and testing equipment. A further need exists to provide a plurality of bypass switch circuits for the dual sensor temperature switch that will enable maintenance personnel to isolate and calibrate components of the device without removing the temperature switch from process service. A still further need exists to provide a dual sensor temperature switch wherein when one of the sensors is operationally bypassed from the transport system, the process can continue to be monitored solely by the remaining on-line sensor, and wherein the ability to open the device's switch output circuit is maintained even if one of the sensors fails entirely or is otherwise rendered ineffective.

BRIEF SUMMARY OF THE INVENTION

A high-diagnostic, dual sensor temperature switch useful for monitoring process conditions in commercial and industrial fluid transport systems is provided, the temperature switch comprising a plurality of sensor circuits, wherein each sensor circuit further comprises a temperature sensor, an analog-to-digital (also referred to as "A/D") signal converter, a data processor or central processing unit, an output circuit, and an output switch; an analog signal comparator; and a diagnostics circuit further comprising an integrated diagnostics processor, a master diagnostics switch, and a plurality of servant diagnostics switches.

DETAILED DESCRIPTION OF THE INVENTION

A principal advantage of the presently disclosed Ioo2D process temperature switch is that each of the dual sensors is provided with a separate process connection. The configuration is designed to eliminate system down time resulting from a single closed or plugged process valve.

Figure 1:
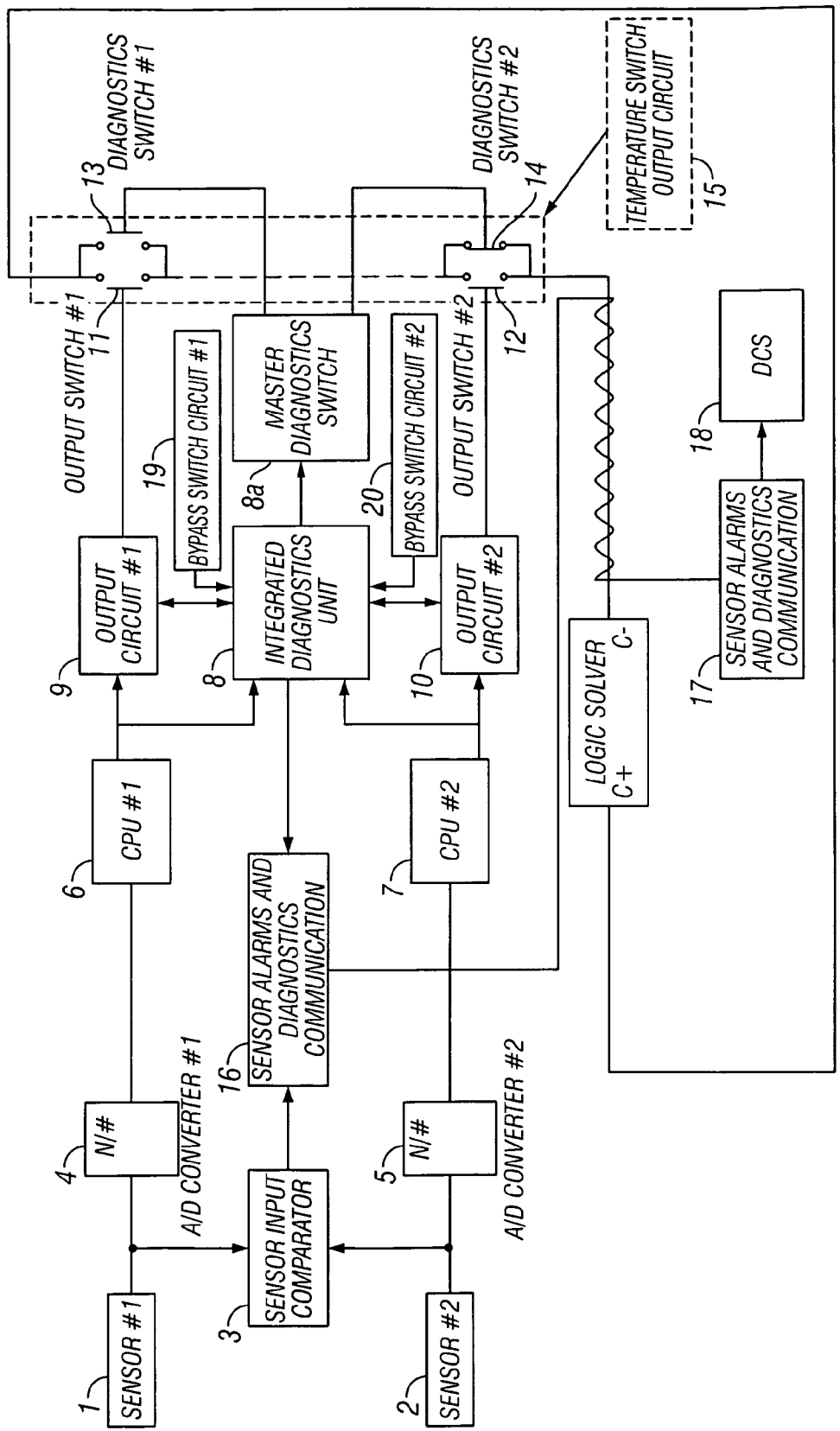
FIG. 1 is a schematic of a dual sensor temperature switch having a Ioo2D voting architecture according to an embodiment of the present invention.

As seen in FIG. 1, for example, a dual sensor temperature switch having a Ioo2D voting architecture is depicted comprising a first temperature sensor 1 and a second temperature sensor 2; a sensor input comparator 3; a first A/D converter 4 and a second A/D converter 5; a first CPU 6 and a second CPU 7; an integrated diagnostics processor 8; a master diagnostics switch 8*a*; a first output circuit 9 and a second output circuit 10; a first output switch 11 and a second output switch 12; a first diagnostics switch 13 and a second diagnostics switch 14; a temperature switch output circuit 15; sensor alarms and diagnostics communicators 16 and 17;

a distributive control system (DCS) 18; and a plurality of bypass switch circuits 19 and 20.

In practice, temperature sensors 1 and 2 output analog electrical signals that are directly compared by a sensor input comparator 3 prior to conversion to digital signals by the plurality of A/D converters 4 and 5, respectively.

Direct comparison of the analog signals by sensor input comparator 3 enables prompt detection of significant deviations between the temperature readings of sensors 1 and 2 in excess of a particular temperature range, each sensor having been pre-assigned a temperature range considered within its acceptable operating parameters.

If the deviations in temperature readings from sensors 1 and 2 exceed a predetermined acceptable range, then sensor input comparator 3 immediately outputs a signal to sensor alarms and diagnostics communicators 16 and 17, such that an operator (or a monitoring CPU or data processor) quickly becomes aware of the problem so that further action can be initiated to preserve the operational integrity of the process system via DCS 18. The sensor alarms communicate diagnostics information regarding, for example, a particular process valve (or tap) that is either closed or plugged, or that one (or both) of the temperature sensors has become deformed due to heat or fatigue, etc.

Provided that no alarm warranting immediate shut-down of the process system is initiated by the sensor alarms and diagnostics communicators 16 and 17 (for example, in the unusual event both sensors are simultaneously found to be defective), the plurality of A/D converters 4 and 5 will output their respective converted digital signals to said plurality of associated CPUs 6 and 7. In other words, the converted digital signals created by A/D converter 4 are output directly to CPU 6, and the converted digital signals created by A/D converter 5 are output directly to CPU 7, for signal normalization and further routing within the temperature switch circuit.

At this point, the normalized digital signals output from CPUs 6 and 7 are routed directly to integrated diagnostics processor 8 before further transmission to each of output circuits 9 and 10, respectively, via master diagnostics switch 8a. According to one aspect of the invention, integrated diagnostics processor 8 and master diagnostics switch 8a are separate system components operating in mutual electrical communication; in other embodiments, integrated diagnostics processor 8 and master diagnostics switch 8a are structurally integral.

Output circuits 9 and 10 are designed such that their respective output signals are passed to integrated diagnostics processor 8 prior to the opening of either of output switches 11 and 12. The resulting delay allows each of diagnostics switches 13 and 14 to close before either of output switches 11 or 12 are erroneously opened. Diagnostic switches 13 and 14 will only reopen responsive to a signal output from master diagnostics switch 8a, the particular signal being determined based on the logical protocol shown in FIGS. 2 and 4, and as described in the truth tables provided in FIGS. 3 and 5. The device's essential circuitry and associated logic are next described with further reference to the mentioned figures.

First, and referring still to FIG. 1, the presently disclosed device comprises at least two discrete sensor circuits. In the depicted embodiment, a first sensor circuit comprises a temperature sensor 1, an A/D converter 4, a CPU 6, an output circuit 9, and an output switch 11.

In practice, temperature sensor 1 sends an analog electrical signal to A/D converter 4, where the analog signal is converted to digital. The converted digital signal is then output directly to CPU 6, which generates a logical output signal of either 0 or 1 based on an adjustable, predetermined set point. CPU 6 then sends a logical output signal to output circuit 9. Output circuit 9 receives the digital signal output from CPU 6, and opens output switch 11 only when the logical output signal is a 0. Output switch 11 remains closed when the logical output signal is a 1.

Sensor circuit 2 (also shown in FIG. 1) is constructed similarly, and comprises temperature sensor 2, A/D converter 5, CPU 7, output circuit 10 and output switch 12. Temperature sensor 2 sends an analog electrical signal to A/D converter 5, where the analog signal is converted to digital. The converted digital signal is then output to CPU 7, which generates a logical output signal of either 0 or 1 based on an adjustable, predetermined set point. CPU 7 then sends the logical output signal to output circuit 10. Output circuit 10 receives the output signal from CPU 7, and opens output switch 12 only when the logical output signal is a 0. Output switch 12 remains closed when the logical output signal is a 1.

Figures 4, 5:
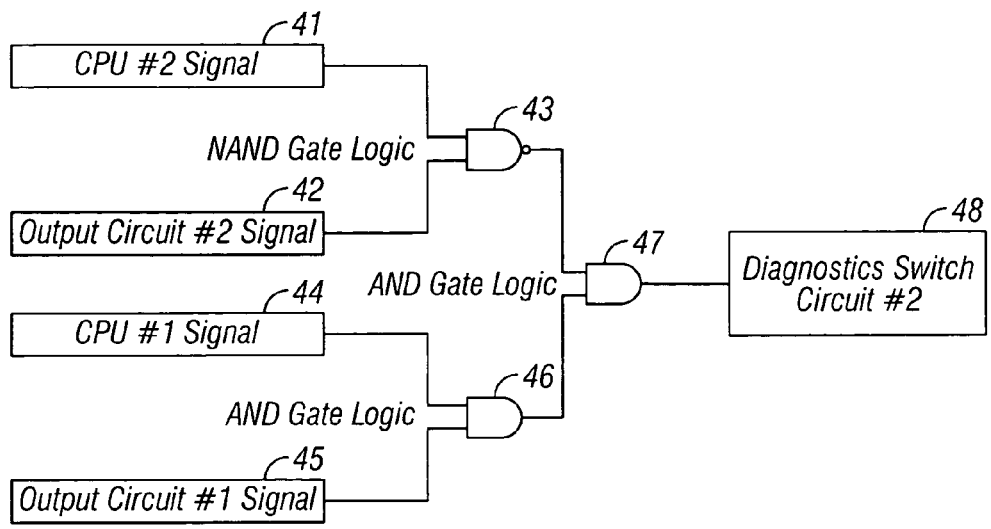
FIG. 4 is a schematic of a second diagnostic switch circuit's associated logic protocol according to a further embodiment of the invention.
FIG. 5 is a truth table summarizing the possible logic states for said second diagnostics switch circuit according to a further embodiment of the invention.

The disclosed dual sensor temperature switch also includes an integrated diagnostics circuit comprising at least an integrated diagnostics unit 8 and a master diagnostics switch 8a (see FIG. 1), and a plurality of responsive diagnostics switch circuits. The logical protocol associated with operation of each of the diagnostics switches is depicted in FIGS. 2 and 4, and discussed in greater detail immediately below.

Figures 2, 3:
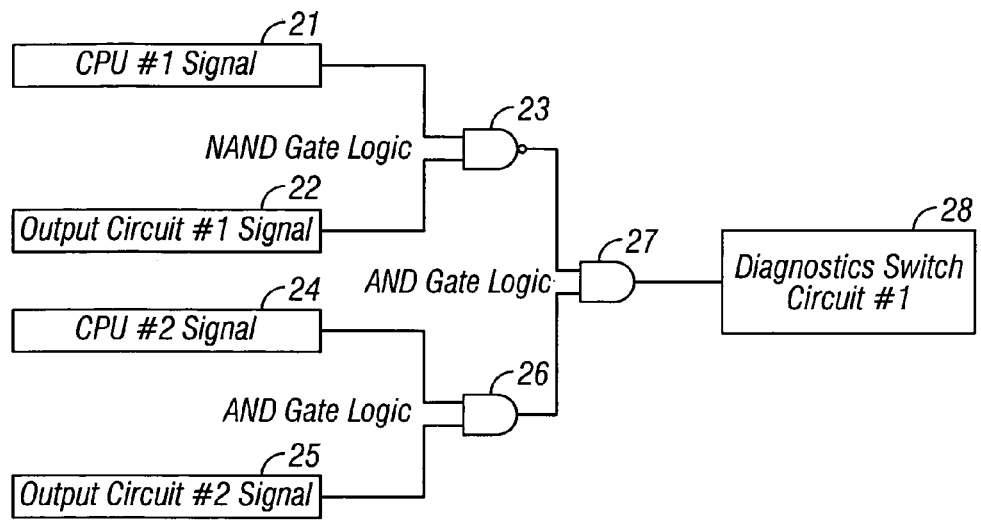
FIG. 2 is a schematic of a first diagnostics switch circuit's associated logic protocol according to a further embodiment of the invention.
FIG. 3 is a truth table summarizing the possible logic states for said first diagnostics switch circuit according to a further embodiment of the invention.

Referring to FIG. 2, the logical protocol of diagnostics switch circuit 28 is shown comprising a logical signal input from said first CPU 21, a signal input from said first output circuit 22, a signal input from said second CPU 24, and a signal input from said second output circuit 25. Both of the logical output signals from said first CPU and said first output circuit are transmitted to integrated diagnostics processor 8 where they are input to NAND gate logic 23. The NAND gate logic evaluates the collective input signals and outputs a responsive logical output of either 0 or 1. A logical 0 is output from the NAND gate logic when the evaluated input signals match, and a logical 1 is output when the evaluated input signals do not match.

Similarly, each of the logical output signals from said second CPU and said second output circuit are transmitted to integrated diagnostics processor 8, where they are input to AND gate logic 26. The AND gate logic evaluates the collective input signals and outputs a responsive logical output of either 0 or 1. A logical 0 is output from the AND gate logic when the evaluated input signals do not match, and a logical 1 is output when the evaluated input signals match.

The resulting logical outputs from the NAND gate logic and the AND gate logic are then output to further AND gate logic 27. This gate evaluates its collective input and promulgates a final logical output signal of either 0 or 1 for transmission to first diagnostics switch circuit 28. A logical 0 is output from the AND gate when the input signals do not match, and a logical 1 is output when the compared input signals are the same. Said first diagnostics switch circuit 28 receives the final logical output generated by AND gate 27 via diagnostics master switch 8a, and will open when the received logical input signal is a 0. Conversely, first diagnostics switch 28 will close when the received logical input signal is a 1. A truth table summarizing the possible logical states of first diagnostics switch 28 is provided in FIG. 3.

The logical protocol for said second diagnostics switch 48 is set forth in FIG. 4, and comprises a logical signal input from said second CPU 41, a signal input from said second output circuit 42, a signal input from said first CPU 44, and a signal input from said first output circuit 45. Both of the logical output signals from said second CPU and said second output circuit are transmitted to integrated diagnostics processor 8 where they are input to NAND gate logic 43. The NAND gate evaluates the collective input signals and outputs a responsive logical output of either 0 or 1. A logical 0 is output from the NAND gate logic when the evaluated input signals match, and a logical 1 is output when the evaluated input signals do not match.

Similarly, each of the logical output signals from said first CPU and said first output circuit are transmitted to integrated diagnostics processor 8, where they are input to AND gate logic 46. The AND gate evaluates the collective input signals and outputs a responsive logical output of either 0 or 1. A logical 0 is output from the AND gate logic when the evaluated input signals do not match, and a logical 1 is output when the evaluated input signals are the same.

The resulting logical outputs from the NAND gate logic and the AND gate logic are then output to further AND gate logic 47. This gate evaluates its collective input and promulgates a final logical output signal of either 0 or 1 for transmission to second diagnostics switch circuit 48. A logical 0 is output from the AND gate when the input signals do not match, and a logical 1 is output when the compared input signals are the same. Second diagnostics switch circuit 48 receives the final logical output generated by AND gate 47 via diagnostics master switch 8a, and will open when the received logical input signal is a 0. Conversely, second diagnostics switch 48 will close when the received logical input signal is a 1. A truth table summarizing the possible logical states of second diagnostics switch 48 is provided in FIG. 5.

The foregoing specification is provided for illustrative purposes only, and is not intended to describe all possible aspects of the present invention. Moreover, while the invention has been shown and described in detail with respect to several exemplary embodiments, those of ordinary skill in the pertinent arts will appreciate that minor changes to the description, and various other modifications, omissions and additions may also be made without departing from either the spirit or scope thereof.

What is claimed is:

1. A dual sensor process temperature switch having a one-out-of-two voting architecture, said switch comprising:
    a first temperature sensor for sensing a first process temperature in a fluid transport system, and for outputting a first analog sensor signal to each of a sensor input comparator and a first A/D converter;
    a second temperature sensor for sensing a second process temperature in a fluid transport system, and for outputting a second analog sensor signal to each of a sensor input comparator and a second A/D converter;
    a sensor input comparator for receiving said first analog sensor signal from said first temperature sensor, and for receiving said second analog sensor signal from said second temperature sensor;
    a first A/D converter for receiving said first analog sensor signal from said first temperature sensor, and for converting said first analog sensor signal into a corresponding first digital sensor signal and then sending said first digital sensor signal to a first data processor;
    a second A/D converter for receiving said second analog sensor signal from said second temperature sensor, and for converting said second analog sensor signal into a corresponding second digital sensor signal and then sending said second digital sensor signal to a second data processor;
    a first data processor for receiving said first digital sensor signal, and for generating a first logical output signal based on a predetermined set point and then sending said first logical output signal to an integrated diagnostics unit;
    a second data processor for receiving said second digital sensor signal, and for generating a second logical output signal based on a predetermined set point and then sending said second logical output signal to an integrated diagnostics unit;
    an integrated diagnostics unit for receiving said first logical output signal from said first data processor and said second logical output signal from said second data processor, and for communicating with a master diagnostics switch to generate a switch control signal responsive to said first logical output signal and said second logical output signal;
    a master diagnostics switch for communicating with said integrated diagnostics unit to generate a switch control signal responsive to said first logical output signal and said second logical output signal, and for outputting said switch control signal to a plurality of servant diagnostics switches;
    a plurality of servant diagnostics switches responsive to a switch control signal received from said master diagnostics switch.

2. The dual sensor process temperature switch of claim 1, further comprising a plurality of bypass switch circuits, wherein said plurality of bypass switch circuits enable an operator to perform maintenance on said dual sensor process temperature switch while a fluid transport system in which said dual sensor process temperature switch is disposed remains on-line.

3. The dual sensor process temperature switch of claim 2, wherein said plurality of bypass switch circuits further comprise a first bypass switch circuit and a second bypass switch circuit, and wherein each of said first bypass switch circuit and said second bypass switch circuit are in electrical communication with said integrated diagnostics unit.

4. The dual sensor process temperature switch of claim 3, wherein each of said first bypass switch circuit and said second bypass switch circuit are in electrical communication with said master diagnostics switch.

5. The dual sensor process temperature switch of claim 1, wherein said sensor input comparator compares said first analog sensor signal received from said first temperature sensor and said second analog sensor signal received from said second temperature sensor, and wherein detection of a predetermined condition relating to each of said first analog sensor signal and said second analog sensor signal causes said sensor input comparator to output a warning signal to a sensor alarm.

6. The dual sensor process temperature switch of claim 5, wherein when said sensor input comparator detects said predetermined condition relating to each of said first analog sensor signal and said second analog sensor signal, said sensor alarm is capable of communicating information to an operator regarding whether a fluid transport system in which said dual sensor process temperature switch is disposed is in either an open state or a closed state.

7. The dual sensor process temperature switch of claim 5, wherein when said sensor input comparator detects said predetermined condition relating to each of said first analog sensor signal and said second analog sensor signal, said sensor alarm is capable of communicating information to an operator regarding whether each of said first temperature sensor and said second temperature sensor is operating within a predetermined operational state.

8. The dual sensor process temperature switch of claim 1, wherein said integrated diagnostics unit and said master diagnostics switch are structurally integral.

9. The dual sensor process temperature switch of claim 1, wherein said integrated diagnostics unit and said master diagnostics switch are not structurally integral.

10. The dual sensor process temperature switch of claim 1, wherein said master diagnostics switch generates a switch control signal responsive to a diagnostics control signal generated by said integrated diagnostics unit.

11. The dual sensor process temperature switch of claim 10, wherein said diagnostics control signal generated by said integrated diagnostics unit is output to a sensor alarm.

12. The dual sensor process temperature switch of claim 10, wherein said diagnostics control signal generated by said integrated diagnostics unit is output to a diagnostics communicator.

13. The dual sensor process temperature switch of claim 12, wherein said diagnostics communicator communicates said diagnostics control signal to a DCS.

14. The dual sensor process temperature switch of claim 13, wherein said diagnostics control signal communicated by said diagnostics communicator to said DCS communicates information regarding pressure sensor deviations, bypass state indicators, and an open/closed state indicator relating to each of said servant diagnostics switches.

* * * * *